United States Patent [19]
Sakamoto et al.

[11] Patent Number: 5,234,614

[45] Date of Patent: Aug. 10, 1993

[54] METHOD FOR PRODUCING MAGNETIC COATING COMPOSITION AND MAGNETIC RECORDING MEDIUM

[75] Inventors: Kazunori Sakamoto, Katano; Yukihiro Shimasaki, Sanda; Yuji Mido, Higashiosaka; Akira Kisoda, Moriguchi, all of Japan

[73] Assignee: Matsushita Electric Industrial Co., Ltd., Osaka, Japan

[21] Appl. No.: 714,608

[22] Filed: Jun. 13, 1991

[30] Foreign Application Priority Data

Jun. 14, 1990 [JP] Japan .................................. 2-156891

[51] Int. Cl.$^5$ .................. C04B 35/04; H01F 1/00; H01F 1/26
[52] U.S. Cl. .......................... 252/62.54; 252/62.53; 366/601; 416/38
[58] Field of Search .................. 252/62.54, 62.53; 366/601; 416/38

[56] References Cited

U.S. PATENT DOCUMENTS

| | | | |
|---|---|---|---|
| 4,002,891 | 1/1977 | Porter | 366/601 |
| 4,076,220 | 2/1978 | Nakashima | 366/601 |
| 4,229,312 | 10/1980 | Nagashiro | 252/62.54 |
| 4,946,615 | 8/1990 | Mizuno | 252/62.54 |

OTHER PUBLICATIONS

Journal of the Society of Powder Technology (Japan) vol. 25, No. 6, pp. 344-349 (1988) Abstract only.
Kagaku Kogaku Ronbunshu, vol. 15, No. 4, pp. 747-753 (1989).

Primary Examiner—Jerry Johnson
Attorney, Agent, or Firm—Wenderoth, Lind & Ponack

[57] ABSTRACT

A magnetic coating composition prepared by a method comprising a wetting step for wetting powder materials including a magnetic powder with a small amount of a solvent in a kneading machine having an agitation means in a closed container, a first kneading step comprising adding an amount of a binder resin and an amount of a solvent to a mixture from the wetting step and mixing and kneading it, a second kneading step comprising continuously adding the solvent till a consumed power of a kneading apparatus reaches maximum, a third kneading step comprising stopping the addition of the solvent at the maximum consumed power and further kneading the mixture, and a dilution step comprising gradually adding the solvent to the mixture while applying shear force, in which composition, the magnetic powder is highly dispersed and which provides a coating type magnetic recording medium having good properties.

8 Claims, 2 Drawing Sheets

METHOD FOR PRODUCING MAGNETIC COATING COMPOSITION AND MAGNETIC RECORDING MEDIUM

BACKGROUND OF THE INVENTION

1. Field of the Invention

The present invention relates to a method for producing a magnetic coating composition and a magnetic recording medium fabricated using the produced magnetic coating composition. More particularly, the present invention relates to a method for producing a magnetic coating composition using a mixing apparatus comprising an agitation means in a closed container.

2. Description of the Related Art

In general, a coating type magnetic recording medium such as a magnetic tape or a magnetic disc has a magnetic layer which is formed from a magnetic coating composition comprising a magnetic powder and small amounts of an abrasive, an antistatic agent, a lubricant, a dispersant and a hardener dispersed in a binder resins. In order to homogeneously disperse a magnetic powder consisting of comparatively fine needle-shape particles with anisotropy in a binder resin containing a solvent to prepare a highly dispersed magnetic coating, a very sophisticated preparation method of a magnetic coating is required and such method is one of the most important techniques in the development of the coating type magnetic recording medium. A degree of dispersion of the magnetic powder has a great influence on not only an electromagnetic conversion property among performances of the medium but also durability of the medium. Therefore, various dispersing methods have been studied and proposed by manufacturers of the magnetic recording media.

Recently, to satisfy requirements for high output and low noise, a coating type magnetic metal recording medium comprising, as a magnetic powder, pure iron magnetic power having a smaller particle size and larger ferromagnetism is predominantly used. To this end, for the purpose of pretreatment, the ferromagnetic iron powder is often mixed with a small amount of the binder resin using a mixing apparatus which generates larger shear force such as a kneader. The magnetic powder particles are strongly agglomerated through their own magnetic attraction force, intermolecular force, and also hydrogen bonds of hydroxyl groups or water present on the particle surfaces. As the magnetic particle size decreases and magnetism increases, the agglomerating force of the powder increases. To disperse the magnetic powder by overwhelming such force, a force larger than the agglomerating force is required. Kneading intends to throughly wet the magnetic powder with a solvent and coat surfaces of the magnetic powder particles with the binder resin uniformly. Since large shear force is applied to the magnetic powder if the magnetic powder and the binder resin are mixed in a highly viscous state, kneading is the most effective method for highly dispersing the fine ferromagnetic powder such as the pure iron powder.

As methods for producing the magnetic coating composition by kneading, methods using a batchwise kneading machine are disclosed in Japanese Patent Kokai Publication Nos. 3030/1971, 104405/1973, 14537/1974, 9102/1978, 76012/1978 and 25406/1980, and methods using a continuous kneading machine are disclosed in Japanese Patent Kokai Publication Nos. 79274/1989, 79275/1989 and 106338/1989, FUNTAI-KOGAKU-SHI (Powder Technology Journal), Vol. 25, 344 (1988) and KAGAKUKOGAKU RONBUNSHU (Chemical Engineering Papers), Vol. 15, 747 (1989).

However, the conventional kneading methods of the magnetic powder forcedly pulverize and disperse the magnetic powder agglomerates with a large shear force only by relying on a strong power of the kneading machine, but neither interfacial phenomenon such as wetting of the magnetic powder particle surfaces with the solvent nor adsorption of the binder resin on the magnetic powder particle surfaces is taken into consideration. To generate strong shear force, it is necessary to reduce an amount of the solvent in the composition as much as possible and knead the composition at high viscosity. However, kneading conditions may vary according to exterior factors such as temperature and humidity or material factors, in particular, a water content, surface chemical properties and a specific surface area of the magnetic powder, so that, in some cases, the kneading is possible, while in other cases, kneading is not possible. Therefore, the composition may not be stably kneaded, or desired dispersibility of the composition may not be achieved by simple kneading under force only.

To highly disperse the magnetic powder, the binder resin should uniformly cover the magnetic powder particles. To this end, air on the surfaces of the magnetic powder particles is expelled and the surface should be well wetted with the solvent. However, the binder resin is not sufficiently adsorbed by forced kneading of the magnetic powder and the binder resin. To achieve kneading, an excess amount of the binder resin is required. But, the excess amount of the binder resin migrates onto the surface of the magnetic layer to form a thin film during calendering. Such thin resin layer causes a loss in spacing between the recording medium and a magnetic head and, in an extreme case, causes deterioration of electromagnetic conversion characteristics of up to several dB. If the composition is kneaded in the presence of too small an amount of the solvent with larger force, the magnetic powder is more strongly agglomerated, and in the worst case, the particles of the magnetic powder are broken, resulting in deterioration of the magnetic properties of the medium.

When a batchwise kneading machine having an agitation blade with a larger occupying volume in a vessel such as a kneader or an internal mixer, kneading under high shear force generates a large amount of heat since the apparatus has a small radiating surface area. Therefore, the binder resin may be decomposed or the solvent may be evaporated, which are causes for nonuniform kneading. In particular, when a cellulose base binder resin is used or the pure iron powder is used as the magnetic powder, the composition may be ignited by heat developed. Such is unfavorable in view of safety.

When the continuous kneading machine is used, powdery materials such as the magnetic powder and the antistatic agent and liquid materials such as the binder resin solution and the solvent are separately supplied. However, it is very difficult to supply them with a constant composition, since flowability of the magnetic powder delicately varies with the water content of the powder particle surfaces, and the viscosity of the binder resin solution varies with ambient temperature. Dispersion of the composition leads to dispersion of the performances of the finally fabricated magnetic recording medium, so that quality control is difficult. Since the kneading machine is not a closed one, when a magnetic material which spontaneously ignites in air such as the pure iron powder is used as the magnetic powder, a tool for purging a feeder or inlet for supplying the powder with nitrogen gas should be provided.

The kneaded composition can be diluted to some extent in the continuous kneading machine by pouring the solvent to the composition which is moving in the kneading vessel at a constant rate from a pouring opening provided in the kneading vessel. In comparison with the batchwise kneading machine in which the composition is diluted with the solvent by gradual addition of the solvent over a long time in the closed container under continuous shear, since the composition is diluted in the kneading vessel having a specific length in the continuous kneading machine, a clearance between paddles is small so that the dilution is carried out in a very short time period and sufficient dilution is not possible even with the high shear force. According to studies by the present inventor, the composition prepared by kneading often has a viscosity of several million to several ten million poise. It is very difficult to dilute such hard composition with the continuous kneading machine, and small masses of the composition tend to remain in the diluted material. Then, it is very difficult to prepare a uniformly diluted material. When the composition is kneaded with the continuous kneading machine, a separate dilution apparatus is provided after the continuous kneading. Therefore, the continuous kneading machine is not attractive in view of its workability, productivity or apparatus costs.

SUMMARY OF THE INVENTION

An object of the present invention is to provide a method for producing a magnetic coating composition whereby a magnetic powder can be highly dispersed by stable kneading of the magnetic powder.

Another object of the present invention is to provide a magnetic recording medium comprising a magnetic layer formed from a magnetic coating composition which is prepared by the method of the present invention.

According to the present invention, there is provided a method for producing a magnetic coating composition, which comprises:

a wetting step for wetting powder materials including a magnetic powder with a small amount of a solvent in a kneading machine having an agitation means in a closed container, a first kneading step comprising adding an amount of a binder resin and an amount of a solvent to a mixture from the wetting step and mixing and kneading it, a second kneading step comprising continuously adding the solvent till a consumed power of a kneading machine reaches maximum, a third kneading step comprising stopping the addition of the solvent at the maximum consumed power and further kneading the mixture, and a dilution step comprising gradually adding the solvent to the mixture while applying shear force.

DETAILED DESCRIPTION OF THE INVENTION

Figure 1:
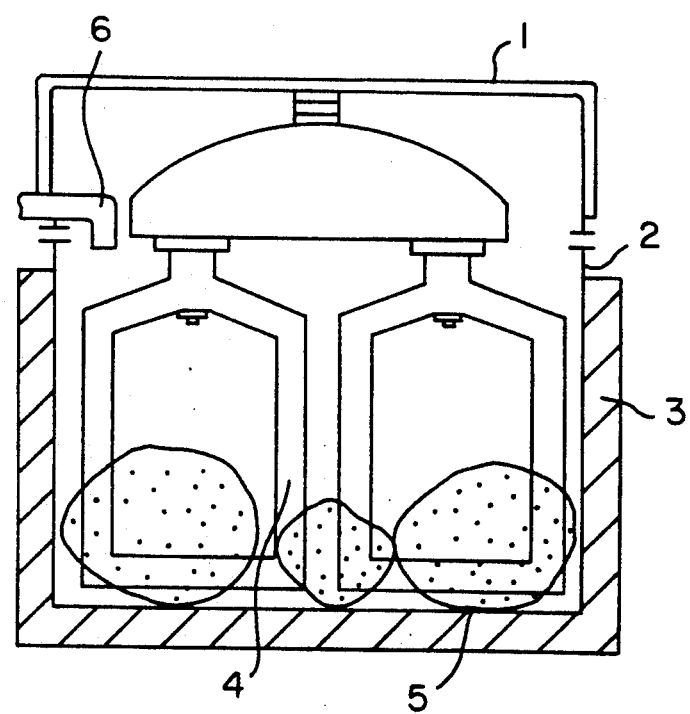
FIG. 1 is a cross sectional view of an example of a kneading machine used in the present invention.

In general, the method of the present invention comprises five steps, namely the wetting step, the first kneading step, the second kneading step, the third kneading step and the dilution step.

The kneading machine to be used in the present invention has agitation blades in the closed container. Preferably, an occupying volume of the blades in the container is comparatively small, and also a clearance between the blades is small. Examples of such kneading machine are a planetary mixer, a Simpson mill and various universal mixing agitators. Though a kneading machine having a twin-arm type large agitation blades such as a kneader, a pressurized kneader, a Banbury mixer or an internal mixer generates larger shear force and strongly kneads the mixture, a large amount of heat is generated during kneading at larger shear force since it has a large occupying volume of the blades in the container and a small radiation surface area. In addition, roots of the agitation blades form dead spots in which the kneading is not sufficiently done so that, homogeneous kneading of the composition is difficult. Since a clearance between the agitation blades is comparatively wide, it is difficult to dilute the composition while applying a uniform shear force to the composition, and small masses of hard composition remain in the diluted composition so that a uniformly diluted composition is hardly produced.

In the wetting step, to powdery materials such as ferromagnetic powder, a small amount of the solvent is added and the mixture is mixed and agitated. This wetting step intends to finely divide the magnetic powder particles which are agglomerated and replace air molecules present on the magnetic powder particles with the solvent molecules so as to wet the powder particles well and accelerate the adsorption of the binder resin onto the magnetic powder particles in the next step.

To divide the magnetic powder particles to some extent and throughly wet them with the solvent, a certain strength of shear force is necessary, and the amount of the solvent should be precisely controlled so as to avoid the damage of the magnetic powder. The amount of the solvent is usually from 5 to 15% by weight, preferably from 7 to 13% by weight of the weight of the magnetic powder. When the amount of the solvent is less than 5% by weight, the powder particles are not well wetted, so that the powder particles tend to agglomerate when the shear force is applied to the powder during mixing. In addition, friction between the powder particles damages, for example, breaks the magnetic powder particles. When the amount of the solvent is larger than 15% by weight, a solid content of the composition is too small when the binder resin is added in the next step and the composition becomes soft, so that the shear force is not sufficiently applied to the composition and the composition is insufficiently kneaded.

As the solvent, any of conventionally used ones may be used. Specific examples of the solvent are ketones (e.g. methyl ethyl ketone, cyclohexanone, diethyl ketone, acetone, etc.), aromatic compounds (e.g. toluene, xylene, etc.), ethers (e.g. diethyl ether, methyl ethyl ether, dioxane, etc.), esters (e.g. ethyl acetate, butyl acetate, etc.) and mixtures thereof. Usually, a mixed solvent such as a mixture of methyl ethyl ketone, toluene and cyclohexanone is used.

In the first kneading step, a solution of the binder resin is gradually added to the wetted magnetic powder while mixing. This step intends to adsorb the binder resin on the magnetic powder particles thoroughly. To knead the composition under large shear force, the composition should form a large hard mass, that is a mass having a large solid content of the magnetic powder. To this end, the amount of the binder resin should be controlled according to the kind of the magnetic powder. Namely, the amount of the binder resin is greatly influenced by the kind of the magnetic powder, whether it is metal powder or iron oxide, or the particle size of the magnetic powder. In the case of the very fine metal powder having a major axis length of 0.16 $\mu$m or less, the amount of the binder resin and solvent are preferably from 16 to 20% by weight and 35 to 50% by weight, respectively, based on the weight of the magnetic powder. In the case of the iron oxide magnetic powder, the amount of the binder resin and solvent are preferably from 9 to 13% by weight and 20 to 35% by weight, respectively, based on the weight of the magnetic powder. When the amount of the binder resin is less than the above lower limit, it is insufficient to bind the magnetic powder so as to form a large mass. To compensate this, an additional amount of the solvent should be added. But, the additional amount of the solvent decreases the solid content of the composition and makes the composition soft, so that the kneading under shear force is impossible. When the amount of the binder resin is too large, an excessive amount of the binder resin is adsorbed on the magnetic powder particles, so that slip occurs between the composition and the agitation blades and the kneading under shear force is impossible.

For the metal magnetic powder, the binder resin is used in a larger amount than in the case of the iron oxide magnetic powder, if the particle sizes are the same. The metal magnetic powder is usually produced by reducing the iron oxide magnetic powder with hydrogen gas. In this reducing step, a large amount of steam is generated from the powder particle surfaces. On the particle surfaces from which the steam has escaped, a large number of pores are formed and the surface is very rough. Therefore, the metal magnetic powder has a much larger surface area than the iron oxide magnetic powder when the particle sizes are the same. According to the study by the present inventors, the metal magnetic powder has a larger BET specific surface area than the iron oxide magnetic powder by at least 10 $m^2/g$. When the specific surface area is larger, a larger amount of the binder resin is required to cover the particle surfaces. By the process of the present invention, it is possible to cover the magnetic powder particles having a major axis length of larger than 0.16 $\mu$m by decreasing the amount of the binder resin.

As the binder resin, any of conventionally used ones may be used. Specific examples of the binder resin are a vinyl chloride-vinyl acetate copolymer, a vinyl chloride-vinyl acetate-vinyl alcohol copolymer, a vinyl chloride-vinylidene chloride copolymer, a polyurethane resin, a polyester resin, an acrylonitrile-butadiene resin, cellulose acetate butyrate, an epoxy resin, a polyvinyl acetal resin, a polyvinyl butyral resin and the like.

As the ferromagnetic powder, any of conventionally used ones may be used. Specific examples of the ferromagnetic powder are needle-shape metal oxide fine ferromagnetic powder (e.g. $\gamma$-$Fe_2O_3$, $CrO_2$, cobalt-deposited $\gamma$-$Fe_2O_3$, etc.), and ferromagnetic metal powder (e.g. Fe, Fe-Co, Fe-Co-Ni, etc.). To the ferromagnetic metal powder, it is possible to add other element such as Al, Cr or Si in a small amount in view of improvement of weather resistance or prevention of sintering in the production steps.

In the second kneading step, the solvent is gradually added to the magnetic powder to which the binder resin is adsorbed in the first kneading step with adjusting the solid content so that the magnetic powder forms large masses, since the sufficient shear force can be applied to the composition and the composition is well kneaded, only when the magnetic powder forms the large masses. Since kneading conditions may vary with ambient conditions such as temperature and humidity, or material factors such as properties of the magnetic powder and a viscosity of the binder resin, the solid content at which the magnetic powder forms the large mass may change in each batch even if the same materials or components are used and kneaded. According to the study by the present inventors, by the measurement of the consumed power, the delicate change of the solid content can be monitored and stable and constant kneading of the composition is possible.

Figure 2:
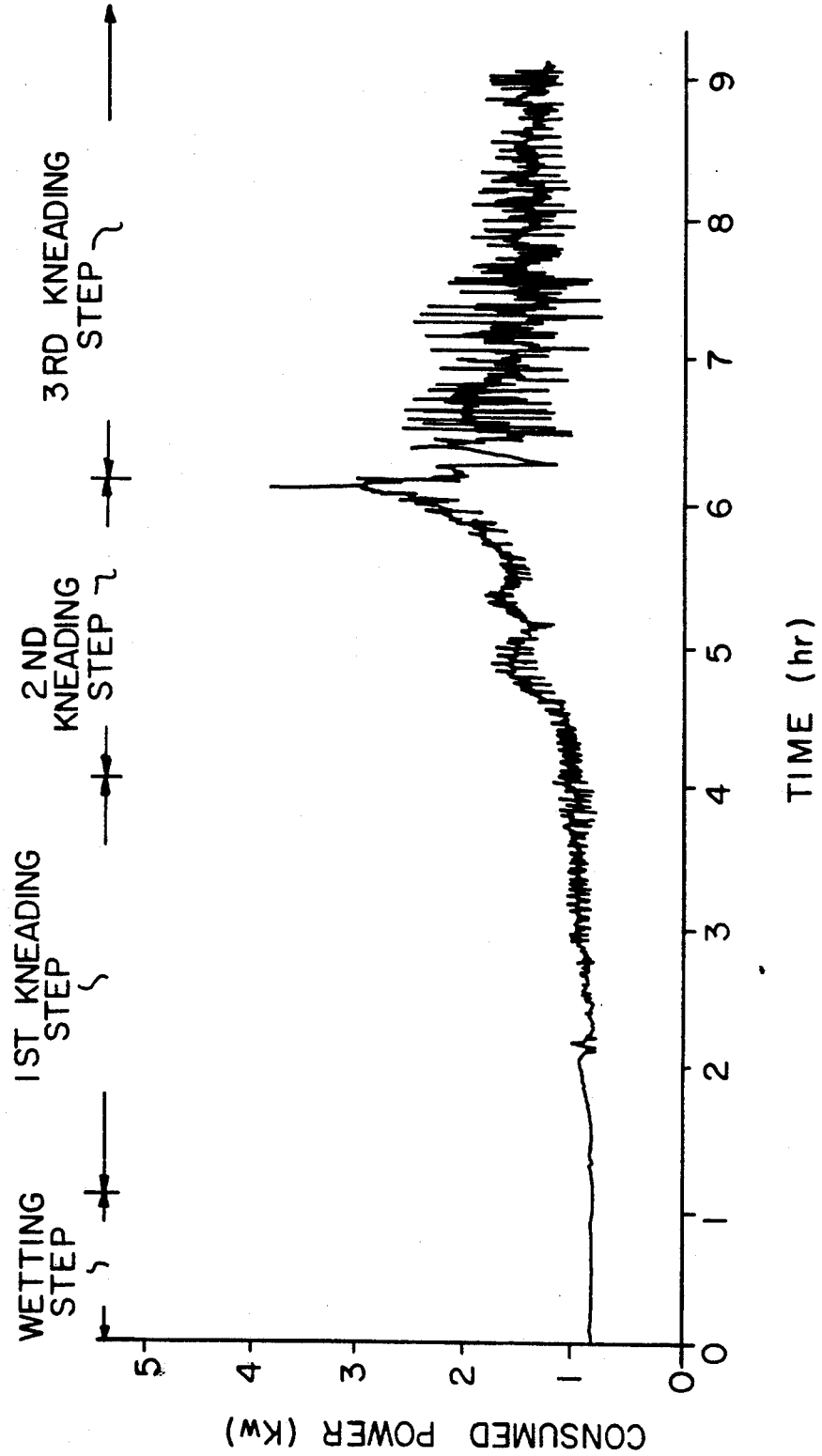
FIG. 2 is a graph showing change of consumed power in the kneading steps of the method according to the present invention.

FIG. 2 shows the change of the consumed power when the composition is kneaded according to the present invention using the mixer of FIG. 1 which comprises an upper portion 1, a lower portion 2, a cooling jacket 3, agitation blades 4 for mixing the composition 5, and an inlet 6 for supplying the binder resin, the solvent and the like. In the wetting step and the first kneading step, since the magnetic powder is in the powder form, the amount of consumed power is small and stable. In these steps, substantially no shear force is applied to the magnetic powder. In the second kneading step, as the solvent is gradually added to the magnetic powder and the magnetic powder is changed from powder to granules and granules to small masses, the amount of consumed power increases and the shear force is applied to the powder. When the solvent is further added, the small masses agglomerate to form larger masses and finally one, two or three masses are formed and the amount of consumed power reaches maximum. At this time, the largest shear force is applied to the composition and the effective kneading of the composition is carried out. Accordingly, even if the ambient conditions or the material factors vary, it is possible to accurately determine the solid content at which the amount of consumed power reaches maximum and to stably knead the composition always.

To accurately determine the solid content at which the amount of consumed power reaches maximum, it is preferred to add the solvent over as long a time as possible. To form the large masses of the composition, a certain period of time is necessary after the addition of the solvent. If a large amount of the solvent is added in a comparatively short time, it is difficult to accurately monitor the change of the amount of consumed power, and the solid content at which the amount of consumed power reaches maximum may be overlooked. Preferably, the solvent is added to the composition at a rate of 1 to 2 parts by weight/hr. per 100 parts by weight of the ferromagnetic powder. When the solvent is added at a rate larger than this range, the solid content at which the amount of consumed power reaches maximum may be overlooked by the above reason. When the rate of addition of the solvent is smaller than the above range, though the solid content at which the amount of consumed power reaches maximum can be accurately determined and good kneading is achieved, the kneading time becomes too long so that the productivity decreases and the cost increases in the industrial scale production.

In the third kneading step, at the solid content at which the amount of consumed power reaches maximum, the addition of the solvent is stopped and then the composition is kneaded under conditions under which the maximum shear force is applied to the composition for a certain time. This step intends to well adsorb the binder resin to the magnetic powder particles and completely remove the air molecules from the particle surfaces so as to increase a packing rate of the magnetic powder. As the kneading is continued, the air molecules on the particle surfaces are replaced with the binder resin and the binder resin is adsorbed on the particle surfaces of the magnetic powder, the composition becomes softer, and in turn, the amount of consumed power decreases as shown in FIG. 2. In the third kneading step, preferably the composition is kneaded for 8 to 10 hours after the amount of consumed power reaches maximum. When the kneading time is shorter than the above range, kneading is insufficient and dispersion of the magnetic power is deteriorated. When the kneading time is longer than the above range, though the dispersion of the magnetic powder is good, the kneading time is too long and the productivity decreases resulting in increase of the cost.

In the dilution step, the solvent is gradually added to the composition which has been kneaded at the high solid content so as to decrease the viscosity to a level suitable for subsequent dispersion. In order to provide a homogeneous magnetic coating composition by diluting the hard composition having a high viscosity of several million to several ten million poise without leaving small masses, the composition should be diluted by the addition of the solvent over a long time while always applying the shear force to the composition. To this end, as a kneading machine, the batchwise kneading machine having small clearances between the agitation blades, and between the agitation blade and the tank wall or the tank bottom is preferably used. When a kneading machine having large clearances is used, some masses having sizes not larger than the clearance remain undiluted, even though the dilution is carried out slowly. Therefore, the kneading machine having the smaller clearance should be used.

An addition time of the solvent is comparatively long since a difference of viscosity between the composition and the solvent is very large at the start of dilution. Therefore, at the start of dilution, the amount of the solvent to be added in a unit time is made as small as possible, and after the certain amount of the solvent is added and the solid content and the viscosity decrease, the amount of the solvent should be increased. Preferably, in the first one hour dilution, the solvent is added at a rate of 10 to 15 parts by weight/hr. and thereafter at a rate of 20 to 30 parts by weight/hr. per 100 parts by weight of the magnetic powder. By the first one hour dilution, the viscosity of the composition is decreased to 10,000 poise, and thereafter, it is possible to uniformly dilute the composition even at a high addition rate of the solvent.

The total amount of the solvent is from 100 to 150 parts by weight per 100 parts by weight of the magnetic powder. When the amount of the solvent is smaller than this range, due to high viscosity, a dispersion efficiency is bad and the composition has poor workability in the subsequent dispersion which is carried out by a sand grinder or a high speed impeller disperser. When the amount of the solvent is larger than the above range, the composition has too low viscosity so that, when it is dispersed with a disperser using a medium such as steel beads or glass beads, impact is strong and worn powder of the beads contaminates the magnetic coating composition, or in the worst case, the magnetic powder particles tend to be broken during the dispersing step.

PREFERRED EMBODIMENTS OF THE INVENTION

The present invention will be illustrated by the following Examples, in which "parts" and "%" are by weight unless otherwise indicated.

EXAMPLE 1

The following components were charged in a 50 liter planetary mixer in a nitrogen atmosphere (oxygen content of 2% by weight or less) and mixed for one hour (wetting step):

| Component | Parts |
|---|---|
| Ferromagnetic metal powder (major axis length: 0.15 μm coercive force: 1500 Oe specific surface area: 53 m$^2$/g water content: 0.5% by weight sintering preventing agent: Al$_2$O$_3$, 2.5%) | 100 |
| Carbon black (Seest GS manufactured by Tokai Carbon Co., Ltd.) | 1 |
| Methyl ethyl ketone | 4 |
| Toluene | 3 |
| Cyclohexanone | 2 |

Then, a mixture of the following components was gradually added to the planetary mixer over 2 hours from a separate tank and mixed for one hour (first kneading step):

| Component | Parts |
|---|---|
| SO$_3$Na-containing vinyl chloride-vinyl acetate copolymer (MR-110 manufactured by Nippon Zeon Co., Ltd.) | 9 |
| SO$_3$Na-containing polyurethane resin (UR-8300 manufactured by Toyobo) | 9 |
| Methyl ethyl ketone | 18 |
| Toluene | 18 |
| Cyclohexanone | 6 |

To the mixture in the planetary mixer, a mixed solvent of methyl ethyl ketone, toluene and cyclohexanone in a weight ratio of 2:1:1 was added at a rate of 1 part/hr per 100 parts by weight of the magnetic powder. The addition of the mixed solvent was continued till the composition formed large masses and the amount of consumed power reached maximum (second kneading step).

After the amount of consumed power reached maximum and the addition of the mixed solvent was stopped, the mixture was further kneaded for 8 hours (third kneading step).

Then, the following amounts of the solvents were added at a rate of 10 to 15 parts/hr in the first one hour and, thereafter, at a rate of 20 to 30 parts/hr and mixed to dilute the composition (dilution step):

| Solvent | Parts |
| --- | --- |
| Methyl ethyl ketone | 45 |
| Toluene | 45 |
| Cyclohexanone | 13 |

To the diluted composition, the following materials were added and mixed by a dissolver and dispersed by a sand grinder to prepare a magnetic coating composition:

| Material | Parts |
| --- | --- |
| Diluted composition | 297.5 |
| α-Al$_2$O$_3$ (particle size of 0.3 μm) | 7 |
| Methyl ethyl ketone | 8 |
| Toluene | 8 |
| Cyclohexanone | 2 |

To the magnetic coating composition, the following ingredients were further added, and the resulting composition was coated on a film:

| Ingredient | Parts |
| --- | --- |
| Stearic acid | 3 |
| n-Butyl stearate | 1 |
| Colonate L | 5 |

The resulting composition was coated on a polyester base film having a thickness of 15 μm to a dry coating thickness of 4 μm and orientated by the application of orientation magnetic field. Then, the coated film was dried with hot air, calendered at 80° C. and then cured in an oven kept at 60° C. for 24 hours. After curing, a backcoating layer was coated to a dry thickness of 0.6 μm, and the film was cut to a width of ½ inch to produce a metal video tape.

EXAMPLE 2

In the same manner as in Example 1 except that ferromagnetic metal powder having a major axis length of 0.13 μm and a specific surface area of 60 m$^2$/g was used in place of the ferromagnetic metal powder having the major axis length of 0.15 μm and the specific surface area of 53 m$^2$/g, a magnetic coating composition was prepared and a metal video tape was fabricated.

EXAMPLE 3

In the same manner as in Example 1 except that ferromagnetic metal powder having a water content of 1.1% and containing 1.5% of Al$_2$O$_3$ and 1.0% of SiO$_2$ as the sintering preventing agents was used in place of the ferromagnetic metal powder having the water content of 0.5% and containing 2.5% of Al$_2$O$_3$, a magnetic coating composition was prepared and a metal video tape was fabricated.

EXAMPLE 4

The following components were charged in a 50 liter planetary mixer in a nitrogen atmosphere (oxygen content of 2% by weight or less) and mixed for one hour (wetting step):

| Component | Parts |
| --- | --- |
| Cobalt-deposited γ-Fe$_2$O$_3$ (major axis length: 0.15 μm | 100 |
| coercive force: 8000 Oe | |
| specific surface area: 49 m$^2$/g | |
| water content: 0.5% by weight | |
| sintering preventing agents: Al$_2$O$_3$, 1.5% SiO$_2$, 0.5%) | |
| Carbon black (Seest GS manufactured by Tokai Carbon Co., Ltd.) | 1 |
| Methyl ethyl ketone | 6.5 |
| Toluene | 6.5 |
| Cyclohexanone | 2 |

Then, a mixture of the following components was gradually added to the planetary mixer over 2 hours from a separate tank and mixed for one hour (first kneading step):

| Component | Parts |
| --- | --- |
| SO$_3$Na-containing vinyl chloride-vinyl acetate copolymer (MR-110 manufactured by Nippon Zeon Co., Ltd.) | 10 |
| Methyl ethyl ketone | 9 |
| Toluene | 9 |
| Cyclohexanone | 3 |

To the mixture in the planetary mixer, a mixed solvent of methyl ethyl ketone, toluene and cyclohexanone in a weight ratio of 2:1:1 was added at a rate of 1 part/hr per 100 parts by weight of the magnetic powder. The addition of the mixed solvent was continued till the composition formed large masses and the amount of consumed power reached maximum (second kneading step).

After the amount of consumed power reached maximum and the addition of the mixed solvent was stopped, the mixture was further kneaded for 8 hours (third kneading step).

Then, the following amounts of the solvents were added at a rate of 10 to 15 parts/hr in the first one hour and, thereafter, at a rate of 20 to 30 parts/hr and mixed to dilute the composition (dilution step):

| Solvent | Parts |
| --- | --- |
| Methyl ethyl ketone | 45 |
| Toluene | 45 |
| Cyclohexanone | 13 |

To the diluted composition, the following materials were added and mixed by a dissolver and dispersed by a sand grinder to prepare a magnetic coating composition:

| Material | Parts |
| --- | --- |
| Diluted composition | 277.5 |
| SO$_3$-containing polyurethane resin (UR-8300 manufactured by Toyobo) | 10 |
| α-Al$_2$O$_3$ (particle size of 0.3 μm) | 7 |
| Methyl ethyl ketone | 12 |
| Toluene | 12 |
| Cyclohexanone | 4 |

To the magnetic coating composition, the following ingredients were further added, and the resulting composition was coated on a film:

| Ingredient | Parts |
| --- | --- |
| Stearic acid | 3 |
| n-Butyl stearate | 1 |
| Colonate L | 5 |

The resulting composition was coated on a polyester base film having a thickness of 15 μm to a dry coating thickness of 4 μm and orientated by the application of orientated magnetic field. Then, the coated film was dried with hot air, calendered at 80° C. and then cured in an oven kept at 60° C. for 24 hours. After curing, a backcoating layer was coated to a dry thickness of 0.6 μm, and the film was cut to a width of ½ inch to produce an iron oxide type video tape.

EXAMPLE 5

In the same manner as in Example 4 except that cobalt-deposited γ-$Fe_2O_3$ which had a water content of 1.1% and particle surfaces of which were coated with 0.5% of $Al_2O_3$ and 2.5% of $SiO_2$ in place of the cobalt-deposited γ-$Fe_2O_3$ which had the water content of 0.5% and the particle surfaces of which were coated with 1.5% of $Al_2O_3$ and 0.5% of $SiO_2$, a magnetic coating composition was prepared and a video tape was fabricated.

Comparative Example 1

Without carrying out the wetting step and the first, second and third kneading steps, the following components were charged in the same planetary mixer as used in Example 1 under the same conditions as in Example 1 to prepare a magnetic coating composition and a metal video tape was fabricated:

| Component | Parts |
| --- | --- |
| Ferromagnetic metal powder<br>(major axis length: 0.15 μm<br>coercive force: 1500 Oe<br>specific surface area: 53 m²/g<br>water content; 0.5% by weight<br>sintering preventing agent: $Al_2O_3$, 2.5%) | 100 |
| Carbon black (Seest GS manufactured by Tokai Carbon Co., Ltd.) | 1 |
| $SO_3Na$-containing vinyl chlorie-vinyl acetate copolymer (MR-110 manufactured by Nippon Zeon Co., Ltd.) | 9 |
| $SO_3Na$-containing polyurethane resin (UR-8300 manufactured by Toyobo) | 9 |
| Methyl ethyl ketone | 29 |
| Toluene | 29 |
| Cyclohexanone | 10 |

Comparative Example 2

In the same manner as in Comparative Example 1 except that ferromagnetic metal powder having a water content of 1.1% and containing 1.5% of $Al_2O_3$ and 1.0% of $SiO_2$ as the sintering preventing agents was used in place of the ferromagnetic metal powder having the water content of 0.5% and containing 2.5% of $Al_2O_3$, a magnetic coating composition was prepared and a metal video tape was fabricated.

Comparative Example 3

Without carrying out the wetting step and the first, second and third kneading steps, the following components were charged in the same planetary mixer as used in Example 4 under the same conditions as in Example 4 to prepare a magnetic coating composition and an iron oxide type video tape was fabricated in the same manner as in Example 1:

| Component | Parts |
| --- | --- |
| Cobalt-deposited γ-$Fe_2O_3$<br>(major axis length: 0.15 μm<br>coercive force: 8000 Oe<br>specific surface area: 49 m²/g<br>water content; 0.5% by weight<br>sintering preventing agents: $Al_2O_3$, 1.5%<br>$SiO_2$, 0.5%) | 100 |
| Carbon black (Seest GS manufactured by Tokai Carbon Co., Ltd.) | 1 |
| $SO_3Na$-containing vinyl chloride-vinyl acetate copolymer (MR-110 manufactured by Nippon Zeon Co., Ltd.) | 10 |
| Methyl ethyl ketone | 21 |
| Toluene | 21 |
| Cyclohexanone | 7 |

Comparative Example 4

In the same manner as in Comparative Example 3 except that cobalt-deposited γ-$Fe_2O_3$ which had a water content of 1.1 and particle surfaces of which were coated with 0.5% of $Al_2O_3$ and 2.5% of $SiO_2$ % was used in place of the cobalt-deposited γ-$Fe_2O_3$ which had the water content of 0.5% and the particle surfaces of which were coated with 1.5% of $Al_2O_3$ and 0.5% of $SiO_2$ a magnetic coating composition was prepared and a video tape was fabricated.

Properties of each of the video tapes fabricated in Examples and Comparative Examples were measured as follows:

Consumed power

A clamp type integrating power meter (manufactured by Hioki Denki Co., Ltd.) is used and a peak value during kneading is measured.

Solid content

Solid content (%) is measured at the time when the consumed power is maximum, for the solid materials such as the magnetic powder, the bider resin and carbon black.

Kneading condition

The kneading condition of the composition is observed visually and evaluated according to the following criteria:
  O: The composition forms large masses and has rubbery elasticity and metallic gloss.
  X: Though the composition forms large masses, but is soft and contains small agglomerates of the magnetic powder.
  XX: The magnetic powder remains in a powder form and the composition cannot be kneaded.

Maximum magnetic flux density ($B_m$)

By using a vibration type magnetic flux meter (manufactured by Toei Kogyo Co., Ltd.), $B_m$ at 5 kOe is measured.

Squareness ratio (SQ)

By using the vibration type magnetic flux meter (manufactured by Toei Kogyo Co., Ltd.), a ratio of residual magnetic flux density to $B_m$ is calculated.

Coercive force ($H_c$)

By using the vibration type magnetic flux meter (manufactured by Toei Kogyo Co., Ltd.), $H_c$ at 5 kOe is measured.

Surface gloss

At an angle of 45° or −45°, gloss on the magnetic layer surface after coating is measured.

RF output

In the case of the metal video tape (Examples 1, 2 and 3 and Comparative Examples 1 and 2), by using a commercially available M2 deck, an output at 10 MHz is measured, and in the case of the iron oxide type video tape (Examples 4 and 5 and Comparative Examples 3 and 4), by using a commercially available VHS deck (manufactured by Matsushita Electric Industrial Co., Ltd., an output at 10 MHz is measured. The output is expressed in terms of a difference (dB) from that in Example 1 or 4 (=0 dB).

The results are shown in the following Table.

TABLE

| Example No. | Consumed power (KW) | Solid content (%) | Kneading condition | $B_m$ (G) | SR | Coercive force (G) | Gloss | RF output (dB) |
| --- | --- | --- | --- | --- | --- | --- | --- | --- |
| 1 | 4.2 | 71 | 0 | 3550 | 0.87 | 1580 | 205 | 0 |
| 2 | 3.9 | 70 | 0 | 3500 | 0.86 | 1550 | 200 | −0.3 |
| 3 | 4.0 | 72 | 0 | 3625 | 0.88 | 1565 | 203 | 0.1 |
| 4 | 4.8 | 74 | 0 | 2050 | 0.89 | 942 | 158 | 0 |
| 5 | 4.4 | 73 | 0 | 2010 | 0.88 | 935 | 161 | −0.2 |
| Com. 1 | 2.9 | 64 | X | 3150 | 0.85 | 1450 | 175 | −0.9 |
| Com. 2 | 0.2 | — | XX | 2450 | 0.80 | 1365 | 133 | −2.8 |
| Com. 3 | 2.8 | 68 | X | 1750 | 0.85 | 880 | 148 | −1.2 |
| Com. 4 | 0.2 | — | XX | 1220 | 0.78 | 830 | 112 | −3.1 |

As seen from the results of the Table, when the magnetic coating compositions were prepared by the kneading manner of the present invention, in both the metal video tapes and the iron oxide type video tapes such as the video tapes of Examples 1 and 4, the composition can be kneaded at the high solid content under the conditions where the shear force is well applied, so that the magnetic powder is highly dispersed and filled in the composition. As the result, the video tapes having high RF output are fabricated.

If the material factors are slightly changed, that is, the water content is increased or the surface coating is modified as in Examples 2, 3 and 5 and the binder resin is more difficultly adsorbed on the magnetic powder particles, the compositions can be kneaded at an adjusted solid content with applying sufficient shear force. Therefore, a stable and good composition can be obtained, and the fabricated video tapes have good properties.

In contrast, when all the components are simultaneously charged in the mixer and kneaded as in Comparative Examples 1 and 3, the magnetic powder does not form large masses at a lower solid content at which an excessive amount of the solvent is present. Therefore, the composition is soft and only insufficient shear force is applied to the composition, so that small masses remain in the composition. As the result, the dispersion is poor and the RF output is low. In addition, in the case where the water content of the magnetic powder is high or the surface condition is different so that the binder resin is not well adsorbed by the magnetic powder as in Comparative Examples 2 and 4, the kneading is impossible so that the magnetic powder does not form a large mass and remains in the powder form. When such coating composition is used in the fabrication of the video tape, magnetic properties and the RF output are both considerably deteriorated.

What is claimed is:

1. A method for producing a magnetic coating composition, which comprises:
    a wetting step for wetting a magnetic powder having a major axis size of not larger than 0.16 μm with a small amount of a solvent in a kneading machine having an agitation means in a closed container,
    a first kneading step comprising adding an amount of a binder resin and an amount of a solvent to a mixture from the wetting step and mixing and kneading it,
    a second kneading step comprising continuously adding the solvent till a consumed power of a kneading apparatus reaches maximum,
    a third kneading step comprising stopping the addition of the solvent at the maximum consumed power and further kneading the mixture, and
    a dilution step comprising gradually adding the solvent to the mixture while applying shear force.

2. The method according to claim 1, wherein the amount of said solvent in the wetting step is from 5 to 15% by weight based on a weight of said magnetic powder.

3. The method according to claim 1, wherein the amount of said binder resin and said solvent in the first kneading step are from 16 to 20% by weight and 35 to 50% by weight, respectively, based on the weight of said magnetic powder and said magnetic powder is ferromagnetic metal iron powder having a major axis size of not larger than 0.16 μm.

4. The method according to claim 1, wherein the amount of said binder resin and said solvent in the first kneading step are from 9 to 13% by weight and 20 to 35% by weight, respectively, based on the weight of said magnetic powder and said magnetic powder is ferromagnetic iron oxide powder having a major axis size of not larger than 0.16 μm.

5. The method according to claim 1, wherein, in the second kneading step, said solvent is added at a rate of 1 to 2 parts by weight/hr. per 100 parts by weight of said magnetic powder.

6. The method according to claim 1, wherein, in the third kneading step, kneading is continued for 8 to 10 hours after stopping the addition of said solvent.

7. The method according to claim 1, wherein, in the dilution step, said solvent is added at a rate of 10 to 15 parts by weight/hr. per 100 parts by weight of said magnetic powder in the first one hour, and thereafter at a rate of 20 to 30 parts by weight/hr. per 100 parts by weight of said magnetic powder.

8. The method according to claim 1, wherein, in the dilution step, a total amount of said solvent is from 100 to 150 parts by weight per 100 parts by weight of said magnetic powder.

* * * * *